(12) United States Patent
Morimoto

(10) Patent No.: US 7,363,271 B2
(45) Date of Patent: Apr. 22, 2008

(54) SYSTEM AND METHOD FOR NEGOTIATING AND PROVIDING QUOTES FOR FREIGHT AND INSURANCE IN REAL TIME

(76) Inventor: Nobuyoshi Morimoto, 12 Fl., No. 167, Fu-Hsin N. Rd., Taipei (TW)

( * ) Notice: Subject to any disclaimer, the term of this patent is extended or adjusted under 35 U.S.C. 154(b) by 1237 days.

(21) Appl. No.: 10/133,217

(22) Filed: Apr. 26, 2002

(65) Prior Publication Data

US 2002/0169710 A1 Nov. 14, 2002

Related U.S. Application Data

(60) Provisional application No. 60/286,899, filed on Apr. 26, 2001.

(51) Int. Cl.
*G06Q 40/00* (2006.01)
(52) U.S. Cl. .......................... 705/37; 705/401
(58) Field of Classification Search ................ 705/4, 705/37, 10–44, 1, 401
See application file for complete search history.

(56) References Cited

U.S. PATENT DOCUMENTS

| | | | |
|---|---|---|---|
| 5,873,069 A * | 2/1999 | Reuhl et al. ............ | 705/20 |
| 6,064,981 A * | 5/2000 | Barni et al. ............ | 705/26 |
| 6,108,639 A | 8/2000 | Walker et al. | |
| 6,934,692 B1 * | 8/2005 | Duncan ................... | 705/35 |
| 6,963,854 B1 * | 11/2005 | Boyd et al. ............. | 705/37 |
| 7,024,376 B1 * | 4/2006 | Yuen ....................... | 705/26 |
| 2002/0091620 A1 | 7/2002 | Lin | |
| 2002/0095356 A1 | 7/2002 | Tonegawa et al. | |

FOREIGN PATENT DOCUMENTS

| | | |
|---|---|---|
| WO | 00/70519 | 11/2000 |
| WO | 01/75644 | 10/2001 |

OTHER PUBLICATIONS www.ixsure.de, accessed and translated Nov. 21, 2006.*
International Search Report for GB 0209511.5, mailed Dec. 5, 2002, 5 pages.
"Research: Agents," Victoria Institute, Knowledge Management Group, webpage, Feb. 22, 1998, 3 pages.
"Hub and Spoke vs. Multiple Ports of Call," The World Bank Group, Africa Region, No. 116, Aug. 1998, 5 pages.

* cited by examiner

*Primary Examiner*—Frantzy Poinvil
(74) *Attorney, Agent, or Firm*—Robert C. Kowert; Meyertons, Hood, Kivlin, Kowert & Goetzel, P.C.

(57) ABSTRACT

A system for negotiating logistics and insurance transactions may include interfaces configured to connect logistics providers, insurance providers, and emarketplaces. An agent software module may be configured to search the Internet for pricing information that is used to maintain a current database of pricing and terms. The emarketplaces may be configured to allow purchasers to enter descriptions of items to be shipped and insured. The system may then search the current database to provide the purchaser with a quote for freight and insurance services in real time.

34 Claims, 13 Drawing Sheets

Would You Like A Shipping Quote ○ Yes ○ No ⟵ 400
For The Item You Just Purchased?
Would You Like An Insurance Quote? ○ Yes ○ No ⟵ 402
If Yes, By When Do You Need This Product? [--/--/----] ⟵ 404

What Is The Product's Weight (In Kilograms)? [    ] ⟵ 406

What Are The Product's Dimensions (In Meters)? [ H ] [ W ] [ L ] } 408

Is The Item A Hazardous Material? ○ Yes ○ No  } 410
Is The Item Fragile? ○ Yes ○ No Pick-Up Address [                    ] ⟵ 412
Delivery Address [                    ] ⟵ 414

Pick Up Date [--/--/----] Delivery Date [--/--/----] } 416
Insurance Amount $ [        ] ⟵ 418

Pay With: [                    ] ⟵ 420

Table Of Current Information 130

| Product 450 | Source 452 | Internet Address 454 | Account Number 456 | Price 458 | Quantity 460 | Shipping Location 462 | Lead Time 464 | Contact 466 | Mailing Address 468 |
|---|---|---|---|---|---|---|---|---|---|
| Toothpicks | ABC Lumber Co. | 123.123.123.344, SALES@ABC.COM | 34-3234 | $100 | 1 Gross | Seattle, Wa USA | 30 DAYS | J. Smith | 10 5th St, Seattle, Wa 90023 USA |

⎱ 496

| Service 470 | Source | Internet Address | Account Number | Price | Amount Insured 472 | Deductable 474 | Exclusions 476 | Contact | Mailing Address |
|---|---|---|---|---|---|---|---|---|---|
| Freight Insurance | PDQ Insurance Co | 124.444.123.799, N@PDQ.COM | 345-359 | $10 | $500 | $0 | 06 | J. Smith | 20 7th St, Boston, Ma 00231 USA |

⎱ 498

| Service | Source | Internet Address | Account Number | Price | Max. Weight 480 | Max. Size 482 | Restrictions 484 | Source 486 | Dest. 488 | Pick-Up Date 490 | Delivery Date 492 | Contact | Mailing Address |
|---|---|---|---|---|---|---|---|---|---|---|---|---|---|
| Shipping | Airco Freight Co | 166.989.123.113, G@AIR.COM | 555132 | $10 | 10 LBS | 10X 10X 10 | 03 | Los Angeles | New York | 9/9/02 | 9/19/02 | J. Smith | 7 2nd St, Denver Co 80020 USA |

| Historical Database 146 |||||
|---|---|---|---|---|
| Transaction Number 500 | Consumer Name 502 | Consumer Mailing Address 504 | Consumer Billing Address 506 | Consumer Internet Address 508 |
| Product Price 510 | Quantity 512 | | | |
| Logistics Price 522 | Product Source Name 514 | Product Source Address 516 | Product Source Billing Address 518 | Product Source Internet Address 520 |
| Insurance Price 532 | Logistic Provider Name 524 | Logistic Provider Address 526 | Logistic Provider Billing Address 528 | Logistic Provider Internet Address 530 |
| Payment Information 542 | Insurer Name 534 | Insurer Address 536 | Insurer Billing Address 538 | Insurer Internet Address 540 |
| Tax Information 552 | Product Description 544 | Product Serial No. 546 | Order Date 548 | Scheduled Shipping Date 550 |
| Arbitration Info 562 | Shipping Destination 554 | Shipping Source 556 | Product Weight 558 | Actual Shipping Date 560 |
| Insurance Claim Info 572 | Adjustments 564 | Insurance Terms 566 | Scheduled Arrival Date 568 | Actual Arrival Date 570 |
| | Condition Info 574 | Buyer Acceptance Information (e.g., Digital Signature) 578 | Additional Transaction Related Data 580 ||

FIG. 5

SYSTEM AND METHOD FOR NEGOTIATING AND PROVIDING QUOTES FOR FREIGHT AND INSURANCE IN REAL TIME

CROSS-REFERENCE TO RELATED APPLICATIONS

This application claims the benefit of U.S. Provisional Application No. 60/286,899, filed Apr. 26, 2001.

BACKGROUND OF THE INVENTION

1. Field of the Invention

The present invention generally relates to the Internet. More particularly, the present invention relates to a system and method for negotiating and providing quotes for freight and freight-related insurance services over the Internet.

2. Description of the Related Art

Internet commerce has become an increasingly popular form of commerce in the United States and throughout the world. In general, Internet-based commerce, often referred to as e-commerce, provides advantages to both suppliers and consumers. E-commerce provides vendors and service providers the ability to greatly increase their sales channel and distribution network with minimal cost. An Internet commerce site provides a convenient, effective and secure mechanism for potential buyers to browse, select and purchase goods or services in an easy and simple fashion.

One class of sites that have seen a tremendous increase in popularity are online auctions. Examples of two online auctions are located on the world wide web ("the web") at www.ebay.com and www.auctions.yahoo.com. These auctions allow buyers and sellers across the country and the world to negotiate the sale of a plethora of different goods and services. Everything from collectibles to manufacturing equipment is sold daily on these auctions. In addition to consumer and small business oriented auctions, online auctions for businesses are also developing a following. One example of a business-oriented auction site is located at www.freemarkets.com. These auctions sites, together more traditional retail-type sites, are collectively referred to herein as "emarketplaces".

While these emarketplaces provide an efficient mechanism for allowing distant buyers and sellers to interact, once a sale has been made the difficulties in arranging freight and insurance for the products purchased may impede the completion of the sale. Traditional alternatives such as the United States Postal Service, the United Parcel Service, and Federal Express may not be cost effective or available for larger items (e.g., manufacturing assets such as injection molding machines). Furthermore, even when a traditional solution is available, comparing prices can be time consuming. In many instances, it may be difficult to compare insurance prices separately from freight charges. Thus, it would be desirable to provide a system and method for negotiating and providing quotes for freight and insurance for products and/or services purchased through the Internet.

SUMMARY OF THE INVENTION

The problems set forth above may at least in part be solved in some embodiments by a system or method for negotiating logistics and insurance transactions. In one embodiment, a system may include a first set of interfaces configured to connect two or more logistics providers to the system. A second set of interfaces may be used to connect two or more insurance providers to the system. An agent software module may be used to search a network connected to the system in order to find pricing information and maintain a current database of pricing information and shipping terms. One or more additional interfaces may be configured to connect e-marketplaces to the system, wherein the e-marketplaces are configured to allow purchasers to enter descriptions of items the purchasers wish to ship and insure. In some embodiments the system may be configured to provide real time quotes for both shipping and insurance information to customers. In other embodiments, the system may be configured to provide non-real time (e.g., offline) quotes of shipping and/or insurance information to customers.

In some embodiments, the system may present the user with an option for obtaining a quote for insurance coverage and/or freight services. In some embodiments, reverse auctions may be conducted for prospective insurance and/or freight services in order to allow the system to populate its current database of pricing information with quotes for freight and insurance services. In some embodiments, the system may be configured to cause a pop-up menu to be displayed on a user's computer in response to detecting that the user has made a purchasing decision. The system may also be configured to maintain and update a historical database for information relating to completed transactions. The system may be implemented using the Internet or other network.

As noted above, a method for negotiating logistics and insurance transactions or quotes is also contemplated. In one embodiment, a method includes accessing one or more insurance providers' computer systems to obtain insurance pricing information for one or more representative shipping transactions. The insurance pricing information obtained may then be stored into a current database. The same may be done to obtain freight pricing information from one or more freight carriers' computer systems. This freight pricing information may also be stored into a database of current information (referred to herein as a "current database"). A purchase order may be received from a customer. The purchase order may include information about an item that is to be shipped and/or insured from a first (source) location to a second (destination) location. Next, the database of pricing information (i.e., the current database) may be searched to find corresponding insurance and freight pricing information for the item to be shipped. Quotes may then be provided to the customer based on the least expensive insurance and freight pricing information obtained.

In some embodiments, in response to detecting that the database does not include any corresponding freight pricing information (e.g., the desired destination is not listed in the database), one or more freight carriers' computer systems connected to the network may be accessed directly to obtain the corresponding freight pricing information. The current database may be updated with the new freight pricing information received from the freight carriers' computer system. The same operation may be performed for insurance pricing information that does not exist in the database. In some embodiments, reverse auctions may be conducted to obtain pricing information for the freight and/or insurance services desired by the customer. The methods described herein may preferably be implemented in software (e.g., as a computer program embodied on computer readable medium such as a computer diskette, computer memory, CD-ROM, DVD-ROM, computer tape, or other storage medium), or with a combination of hardware and software.

BRIEF DESCRIPTION OF THE DRAWINGS

Other aspects of the invention will become apparent upon reading the following detailed description and upon reference to the accompanying drawings in which:

FIG. 3 is a diagram depicting one embodiment of the pop-up menu from FIG. 1;

FIG. 4 is a diagram depicting one embodiment of the table/database of current information from FIG. 1;

FIG. 5 is a diagram depicting one embodiment of the historical database from FIG. 1;

Figure 1:
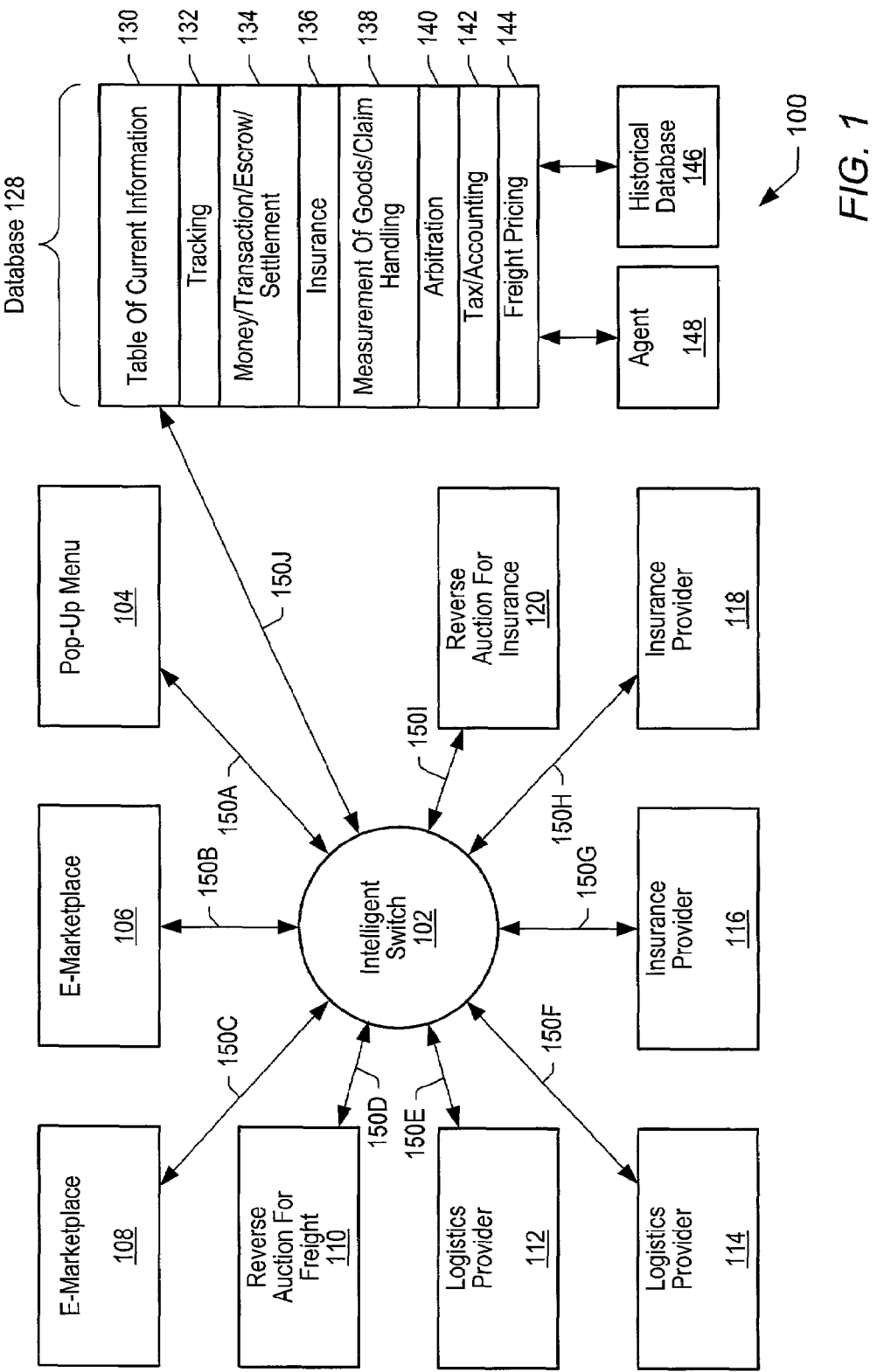
FIG. 1 is diagram depicting one embodiment of a system configured to negotiate and provide quotes for freight and insurance services.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF EMBODIMENTS

Turning now to FIG. 1, one embodiment of a system for negotiating logistics and insurance transactions 100 is shown. In this embodiment, the system includes an intelligent switch module 102 that is connected to a number of other modules via interfaces 150A through 150J. One of these additional modules is pop-up menu module 104. Pop-up menu module 104 may be a software program such as a downloadable plug-in for a web browser. Plug-in pop-up menu module 104 may be configured to detect purchasing decisions by a user. Upon detecting a purchasing decision by the user, pop-up menu module 104 may be configured to display a pop-up menu that asks the user whether the user is interested in having the system negotiate logistics and insurance pricing for the purchase that was just made or is about to be made. In one embodiment, the pop-up menu module 104 may be configured to detect actions such as the entry of a credit card number or the activation of another browser plug-in such as an "e-wallet" program that transmits payment information such as credit card or bank account numbers. Upon detecting the transmission of this information, the pop-up menu module 104 may be configured to assume that a purchase is being made and display the pop-up menu.

As shown in FIG. 1, pop-up menu module 104 may be configured to communicate with intelligent switch module 102 via an interface 150A. In one embodiment, interface 150A may include instant messaging performed over a network such as the Internet. In another embodiment, interface 150A may be implemented using other types of network communications (e.g., FTP and HTTP transmissions). Upon receiving such a communication from pop-up menu module 104, intelligent switch module 102 may be configured to begin the process of searching for pricing information for freight (i.e., logistics) and/or insurance for the shipping of the product.

Intelligent switch module 102 may be configured to begin the search process by interfacing with database 128 which stores information including current pricing information for a number of different freight and/or insurance providers. As shown in FIG. 1, database 128 includes a table of current information 130. Table 130 may include entries that allow the tracking (132) of shipping transactions. Table 130 may also include information relating to payment (134) such as account, payment, escrow, settlement, and money information. For example, payment information 134 may include conversion rates and account information. Payment information 134 may also include tracking numbers for tracking credit card authorizations.

As noted above, database 128 (and table 130) may also include insurance pricing information 136 and freight pricing information 144. As described in further detail below, insurance pricing information 136 and freight pricing information 144 may be maintained by intelligent switch module 102 by means of periodic polling of insurance providers 116 and 118 and logistics providers 112 and 114. Database 128 and table 130 may also include information relating to shipping transactions such as measurement of goods information and claims handling information 138. Other types of information that may be included in database 128 and table 130 is arbitration information 140 and tax/accounting information 142. As shown in the figure, database 128 and table 130 may include both pricing information for presenting a quote to the user (e.g., via pop-up menu module 104) and transaction-related information for tracking transactions for which the user has agreed to the quote provided by the pop-up menu module 104 (e.g., tracking information 132, money/transaction/escrow/settlement information 134, measurement of goods/claim handling information 138, arbitration information 140, and tax/accounting information 142).

Tax/accounting information 142 in database 128 may be used to implement an automatic payment of taxation system. For example, once a user agrees to the quote provided by pop-up menu module 104, intelligent switch module 102 may be configured to use database 128 to determine what, if any, taxes are due on the purchase and/or shipping and/or insurance transaction. This information may be stored in database 128 as indicated by tax/accounting information 142. Once the applicability of any tax is determined, intelligent switch module 102 may be configured to automatically charge the customer the appropriate taxation amount and use the customer's billing information with which to pay the appropriate taxation authority. For embodiments that implement automatic taxation, compliance with taxation regulations may be insured while reducing the amount of paperwork that the user and/or shipper must complete.

Arbitration information 140 may be used in the event that the user has a dispute with either the shipper, insurer, or the party from which the goods were purchased. Arbitration information 140 may include previously agreed upon arbiters and/or the results of an arbitration that has been implemented relating to the purchase, shipping, or insurance transaction.

Measurement of goods/claim handling information 138 may include information such as the weight of the item or the package being shipped and any special handling requirements (e.g., maximum shock levels, maximum and minimum temperature levels, and maximum and minimum humidity levels). In some embodiments, the item being shipped may include a sensor that is configured to communicate with intelligent switch module 102 via a wireless modem. For example, in the event that the item being shipped is an expensive and delicate piece of equipment, the shipping company and/or seller may include a sensor in the crate that periodically transmits via a wireless link to the Internet (e.g., using WAP—wireless access protocol) environmental information that the sensor senses during the shipping transaction. This environmental information may be stored in database 128 as part of measurement of goods information 138.

Money/transaction/escrow/settlement information 134 may include information such as an agreed upon exchange rate either for the purchase of the item being shipped (e.g., for a cost on delivery COD transaction) or for the freight and insurance portions of the transaction. Similarly, settlement information 134 may also include digital signatures captured upon delivery or receipt of the goods by the end recipient.

Tracking information 132 may include such information as a unique identifier or serial number for the transaction and additional information such as periodic updates as to the item's progress during the shipping transaction. For example, if the item travels through multiple shipping ports, the handlers at each shipping port may be configured to enter tracking information into database 128 that allows the end user and the shipper to check on the status of the shipment by interfacing with intelligent switch module 102 and/or pop-up menu plug-in module 104. In some embodiments, intelligent switch module 102 may be configured to periodically update database 128 and table 130 as part of this updating, and intelligent switch module 102 may be configured to store historical information relating to completed transactions into historical database 146.

Digitally storing records relating to completed transactions may, in some embodiments, reduce the need to store paper documents for the purchaser, the seller, the shipping company, and the insurance company. In some embodiments, intelligent switch module 102 may be configured to use an intelligent agent 148 to periodically update database 128 with new insurance pricing information 136 and new freight pricing information 144. In one embodiment, intelligent agent 148 may be a software program executing on a computer system connected to a network such as the Internet. Intelligent agent 148 may be programmed to periodically query one or more different logistics providers (e.g., logistics providers 112 and 114) and one or more insurance providers (e.g., insurance providers 116 and 118) to determine the updated insurance pricing and freight pricing information. In one embodiment, intelligent agent program 148 may be configured to query the logistics providers for representative items to be shipped. As used herein, the term "representative" indicates a fictitious item that is used to establish or update an entry in table 130 (and database 128).

In some embodiments, intelligent switch module 102 may also be configured to connect to e-marketplaces (e.g., e-marketplaces 106 through 108), via interfaces 150B through 150C. In these embodiments, intelligent switch module 102 may be configured to monitor e-marketplaces 106 through 108 in order to update database 128 with pricing information. Furthermore, intelligent switch module 102 may also be configured to allow users to request quotes via interfaces with e-marketplace 106 and 108. For example, a user purchasing an item at an auction in e-marketplace 106 may be presented with a form allowing them to request a quote for freight and/or shipping insurance via intelligent switch module 102. As noted above, in response to receiving the request for quotes, intelligent switch 102 may be configured to query database 128 in order to determine the pricing for the requested freight and/or insurance services. In some embodiments, if the requested freight and/or insurance information is not present in database 128, intelligent switch 102 may be configured to query logistics providers 112 and 114 and insurance providers 116 through 118 directly via interfaces 150E through 150H. In other embodiments, intelligent switch 102 may also be configured to conduct reverse auctions for freight services 110 via interface 150D and reverse auctions for insurance services 120 via interface 150I.

In some embodiments, additional services such as e-marketplaces 106 and 108 and reverse auctions 110 and 120 may be hosted on the same server as intelligent switch 120 and database 128. Similarly, historical database 146 and intelligent agent 148 may also be hosted on the same server. In these embodiments, interfaces 150A through 150J may be implemented via simple program/subroutine calls or simply by passing data amongst different software modules. In other embodiments, e-marketplaces 106 through 108, reverse auctions 110 and 120, and provider sites 112 through 118 may each be hosted on separate computers connected to a network such as the Internet. In these embodiments, interfaces 150A through 150J may be implemented via standard Internet nesting protocols. Intelligent switch module 102, pop-up menu module 104, emarketplaces 106 through 108, reverse auctions 110 and 120, and provider sites 112 through 118, may all be implemented via software programs for executing on computer systems. Similarly, database 128 and historical database 146 may be implemented using existing database technologies such as hierarchical or relational databases (e.g., Oracle8i™, Oracle9i™, mySQL™, or Microsoft SQL Server 2000). Similarly, interfaces 150A through 150J may be executed using scripts such as Perl, SQL Script, or XML interfaces to the databases.

Figure 2A:
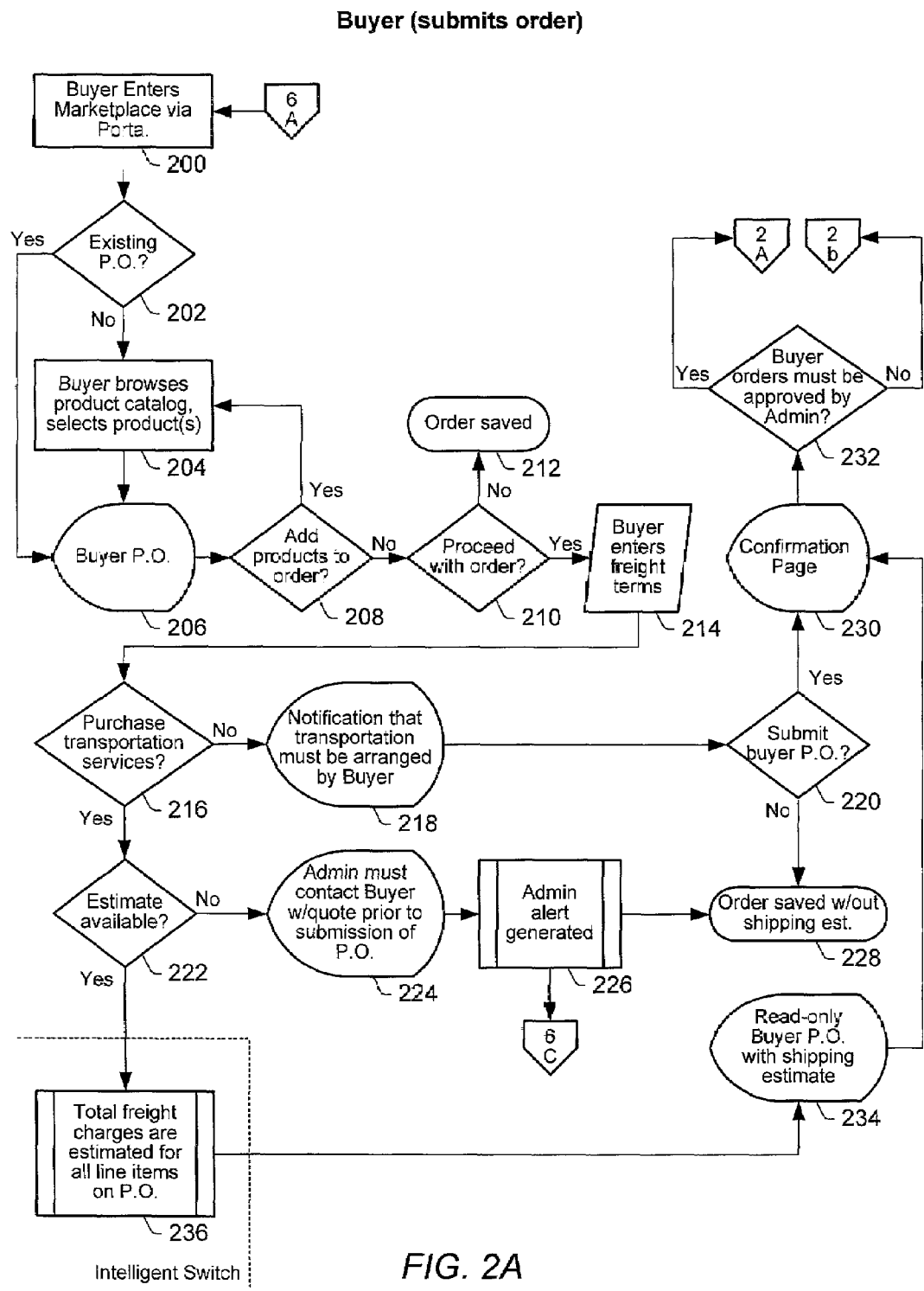
FIGS. 2A-F are a flowchart depicting one embodiment of the emarketplace and intelligent switch from FIG. 1.

Turning now to FIGS. 2A through 2F, one embodiment of e-marketplaces 106 through 108 and intelligent switch 102 from FIG. 1 are shown. As depicted in FIG. 2A, a buyer may enter the e-marketplace via a portal (200). Next, the e-marketplace may be configured to query the buyer to determine whether or not the buyer is interested in an existing purchase order or a new purchase order (202). If the purchaser is not interested in an existing purchase order, the buyer may browse product catalogs and select products that they are interested in (204). If the buyer is interested in an existing purchase order, the e-marketplace software may be configured to prompt the user to enter the purchase order number and pull up the contents of the purchase order (step 206). The emarketplace may be configured to prompt the user to add additional products to the order if desired (208).

Once the additional products have been entered and the user no longer wishes to add any additional products, the user may be prompted to proceed with processing the order (210). If the user does not wish to proceed with the order, the order may be saved for later access (212). If, however, the user does wish to proceed with the order, the user (i.e., the buyer) may be configured to enter freight terms for the order (214). As part of this process, the user may be prompted to determine whether the user wishes to purchase transportation (i.e., freight or shipping) services (216). If the purchaser does not wish to purchase transportation services, then the system may be configured to provide a notification that transportation must be arranged by the buyer (218). The buyer will be prompted whether or not to submit the purchase order (220). If the user decides not to have the purchase order submitted, the order may be saved without a shipping estimate (228). If, however, the buyer decides to have the purchase order submitted, a confirmation page may be presented (230).

Optionally, the system of the e-marketplace and intelligent switch may be configured to require the buyer's order to be approved by a system administrator (232) before it is submitted. Assuming, however, that the purchaser desires to purchase transportation services, then the system may be configured to query database 128 to determine if an estimate is available (222). If an estimate is not available, in one embodiment, the switch may be configured to notify the administrator that the administrator should contact buyer prior to submission of the purchase order (224). An alert to the system administrator may be generated (226), and the order will be saved without a shipping estimate (228). If, however, a shipping estimate is available (236), then the total freight charges (e.g., with and without insurance coverage up to the value of the item being shipped) may be estimated for all line items on the purchase order by the intelligent switch (102).

Next, a read-only buyer purchase order may be provided with the shipping estimate (234). As previously noted, the buyer may be prompted to determine whether the buyer is interested in submitting the purchase order (220). Note, in some embodiments if an estimate is unavailable from database 128, intelligent switch 102 may be configured to query logistics providers 112 through 114 and insurance providers 116 through 118. Similarly, intelligent switch 102 may be configured to conduct reverse auctions for the desired freight and insurance services. In some embodiments, the system may be configured to handle a request for quotes in lieu of or in addition to purchase orders. As noted above, the e-marketplace and intelligent switch may be configured as software running on servers connected to the Internet. This may allow the users (i.e., buyers/purchasers) to access the system from remote locations.

Figure 2B:
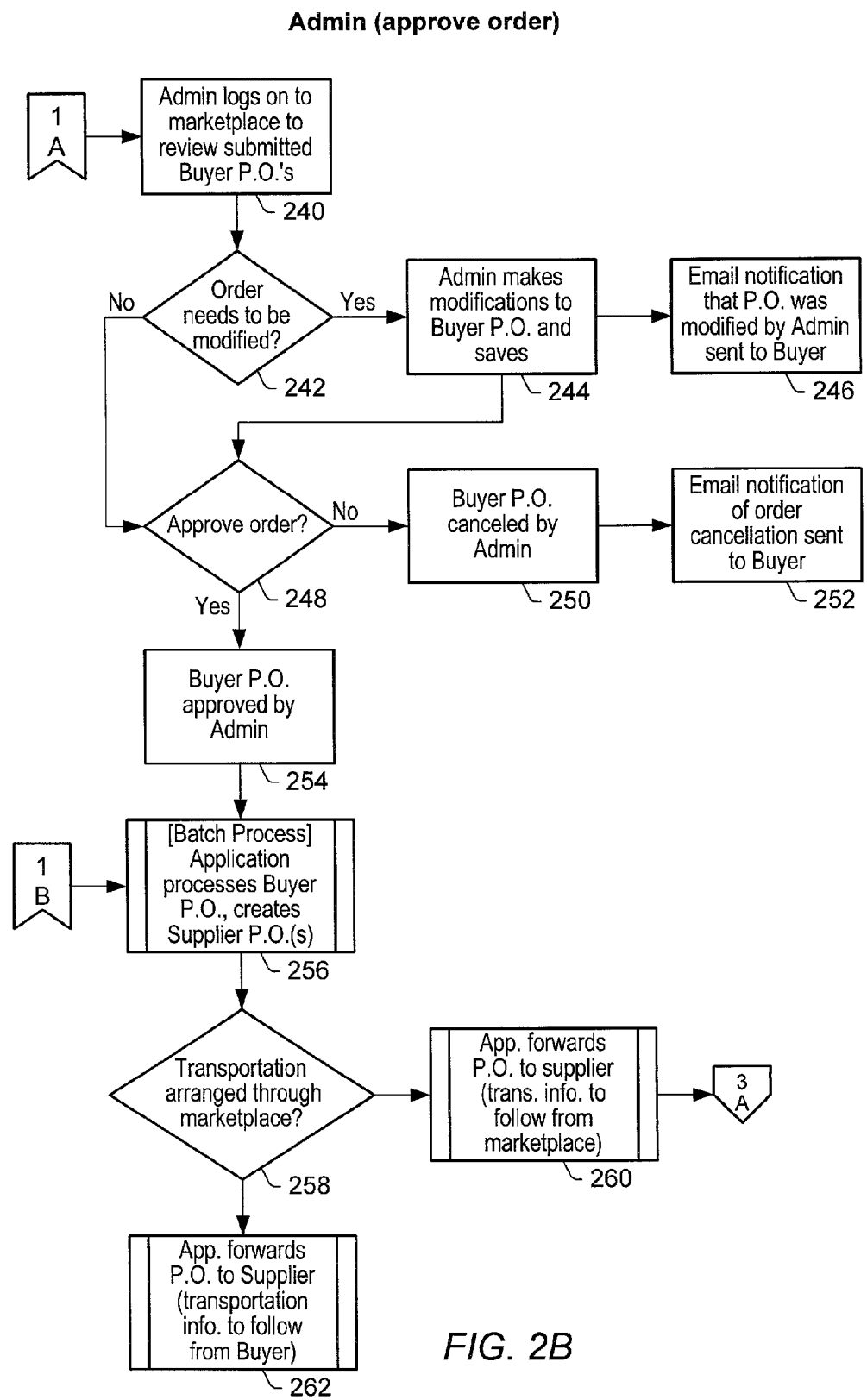

Turning now to FIG. 2B, additional details of one embodiment of e-marketplace 108 and intelligent switch 102 are shown. As shown in FIG. 2B, an administrator may log on to the e-marketplace to review purchase orders submitted by buyers (240). The administrator may be prompted to determine whether or not the orders need to be modified (242). If the administrator determines that the order needs to be modified, the administrator may be allowed to make edits or modifications to a purchase order and save the purchase order (244). The system may be configured to automatically generate an email notification to the buyer that the purchase order was modified by the administrator (246). This e-mail notification may include a copy of the entire modified purchase order in some embodiments.

The administrator may also be prompted to approve the purchase order (248). If the administrator does not approve the order, the order may be cancelled by the administrator (250), and an e-mail notification may be automatically generated to the buyer notifying the buyer of the cancellation (252). Alternatively, the administrator may approve the purchase order (254). The e-marketplace and/or the intelligent switch may be configured to perform a batch process to create supplier purchase orders from the buyer purchase order (256). If transportation is arranged through the e-marketplace (258), then the e-marketplace and the intelligent switch may be configured to forward the supplier purchase orders to the appropriate logistics provider (260). Similarly, the intelligent switch application may be configured to determine whether insurance has been arranged (e.g., via the e-marketplace). If insurance is desired, the intelligent switch may also be configured to forward purchase orders to insurance providers to arrange insurance for the transaction. In the event the user has selected to arrange his or her own transportation, the intelligent switch and/or e-marketplace may be configured to notify the seller or supplier of the goods purchased that transportation information will follow directly from the buyer (262).

Figure 2C:
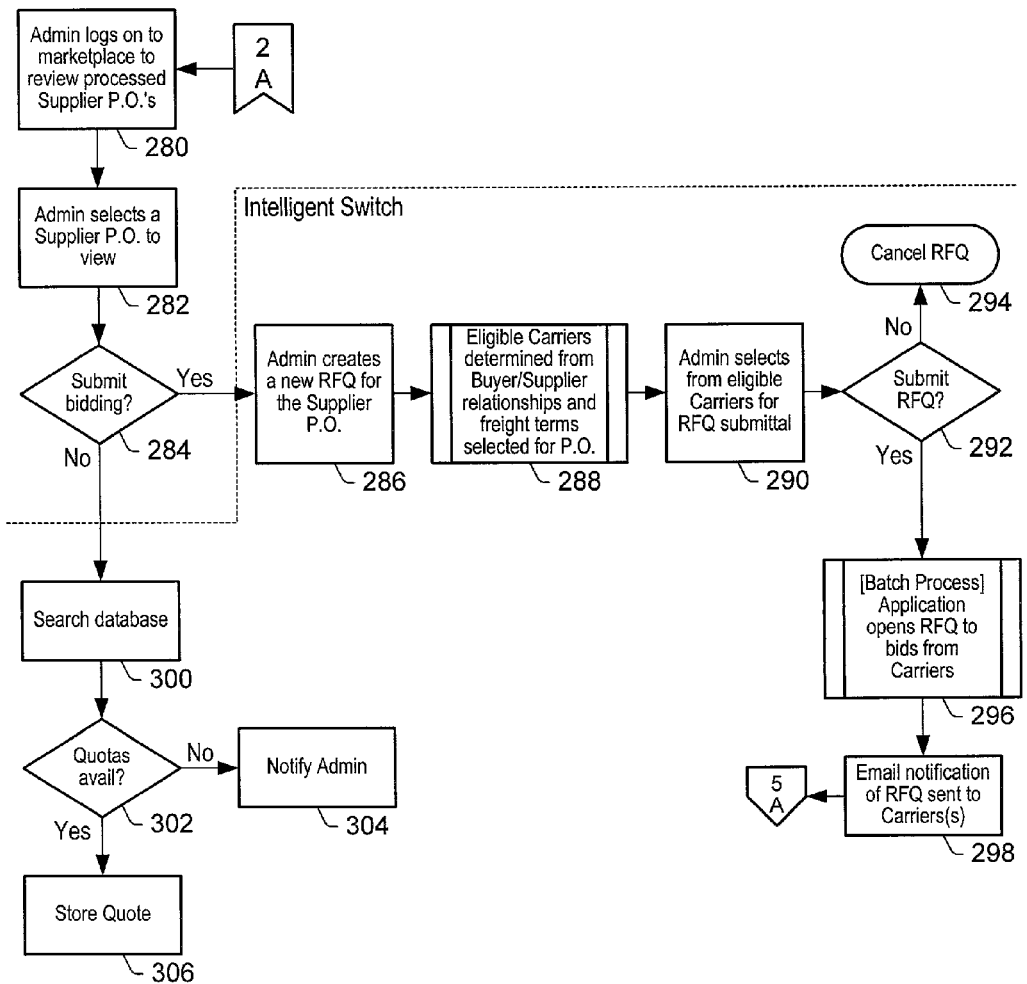

Turning now to FIG. 2C, details of one embodiment of intelligent switch 102 and e-marketplace 108 are shown. As FIG. 2C illustrates, the administrator may log on to the e-marketplace software to view purchase orders from suppliers (280). The administrator may be prompted to select a particular purchase order to view (282). The administrator may be prompted to decide whether to submit the selected supplier purchase order for bidding (284). For example, the purchase order may be submitted to or listed on a reverse auction (e.g., reverse auction for freight 110 or reverse auction for insurance 120). In other embodiments, the purchase order may be supplied directly to a number of logistics and/or insurance providers for quotes. If the purchase order is not submitted for bidding, the system may be configured to search the current database for applicable pricing information (300). If no applicable pricing information is available (302), then the administrator may be notified (304). Similarly, the end user may also be notified in some embodiments by an automatic message or e-mail. If, however, quotes for insurance pricing and rate pricing are available, the system may be configured to select the most advantageous insurance pricing and freight pricing quotes and store them with the purchase order (306). In some embodiments, the system may then be configured to automatically notify the buyer that a match has been found and offer the buyer the opportunity to accept the quote for freight and/or insurance services.

If, however, a particular purchase order is selected for bidding, the administrator may create a new request for quote for the purchase order (286). Note that, in some embodiments, the steps described above as being left to the administrator's discretion may instead be automated. For example, in some embodiments all quotes may be automatically submitted for bidding. If the quote is not submitted to logistics providers or insurance providers, the quotes may be determined from database 128 (288). In some embodiments, the administrator may also manually select which logistics providers will receive the request for quote (290). Alternatively, the system may be configured to automatically select which logistics providers and/or insurance providers shall receive the request for quote (e.g., based on their geographic area of service, the source, and the destination of the item being shipped). The request for quote may either be submitted (292) or cancelled (294). If the request for quote is submitted, the application may be configured to do so in a batch process that automatically receives corresponding bids from the selected logistics and/or insurance providers (296). Depending on the embodiment, e-mail notifications of the request for quote may be sent to the appropriate providers (298), or instant messages or other Internet communication may also be used.

Figure 2D:
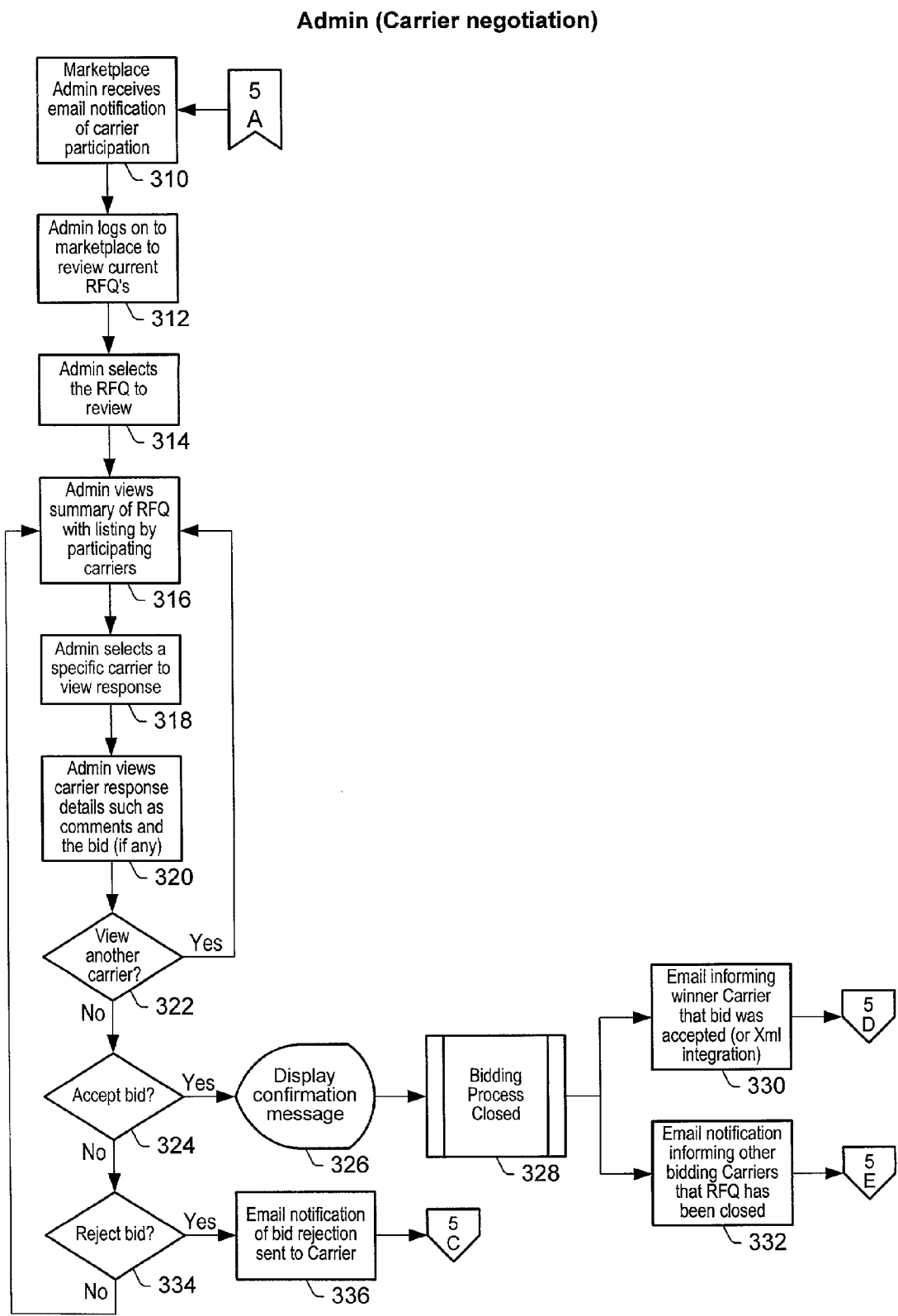

Turning now to FIG. 2D, details of one embodiment of e-marketplace 108 and intelligent switch 102 are shown. As shown in FIG. 2D, the administrator may receive e-mail notifications of provider participation (310). The administrator may also log onto the e-marketplace to review current requests for quotes (312). As previously described, the system may be configured to allow the administrator to select a particular request for quote to review (314) and view a summary of the request for quote with a listing of participating providers (316). The administrator may be provided with an opportunity to select a particular provider in order to review the particular provider's response to the request for quote (318). The system may be configured to display responses from the selected provider (320). The system may allow additional carrier provider bids to be reviewed (322).

The system may also be configured to determine the best bid and accept it (324). Similarly, the system may be configured to automatically reject non-competitive bids (334). A notification as to rejections may be sent to providers (336). For the accepted bid, a confirmation message may be displayed by the system (326). Accepting a bid may close the bidding process for other providers (328). This may result in an e-mail notification notifying the winning and losing providers (330 and 332). Note, depending on the embodiment, selected steps may be implemented to allow manual control by an administrator, or to allow automated control by software based on specified criteria. For example, the system may be configured to automatically select or accept the best (i.e., lowest price) bid that is within the buyer's specified parameters (e.g., delivery time).

Figure 2E:
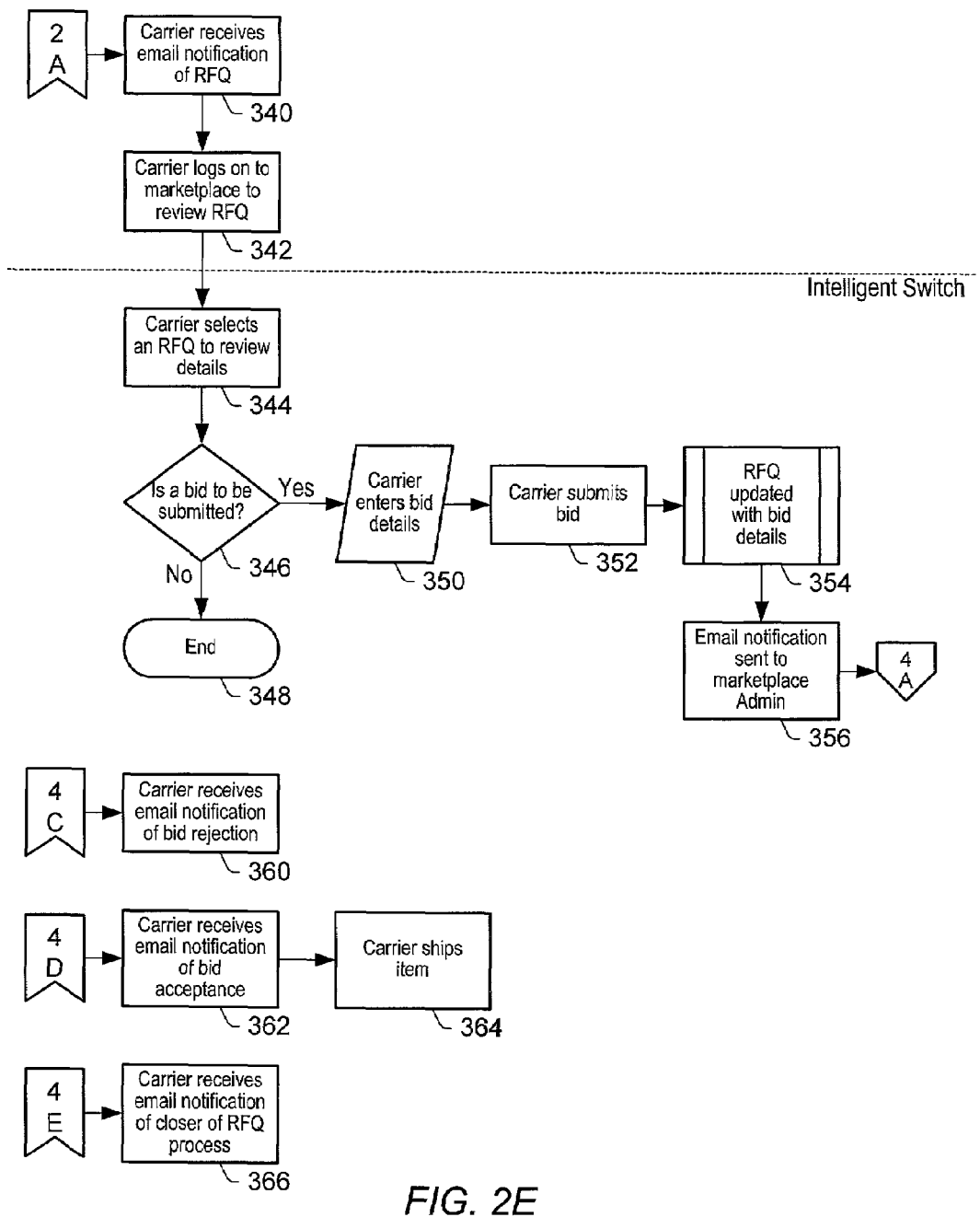

Turning now to FIG. 2E, additional details of one embodiment of intelligent switch 102 and e-marketplace 108 in particular, and system 100 in general, are shown. As illustrated in FIG. 2E, a provider may be configured to receive e-mail notifications of the request for quote (340). In response, the carrier may be allowed to log onto the e-marketplace and cause the intelligent switch to read and display details of the particular request for quote (342). In response to the provider selecting a particular request for quote (344), the system may be configured to allow the provider an opportunity to bid on the selected quote (346). If the provider desires not to bid, the session may end (348). If, however, the provider decides to enter a bid (350), the provider may be prompted to enter the bid details (352), and the request for quote will be updated accordingly (354). In some embodiments, an e-mail notification may be dispatched to the e-marketplace and/or intelligent switch administrator (356).

As illustrated in FIG. 2E, intelligent switch 102 may also be configured to notify carriers via e-mail or instant message of the rejections (360). Similarly, the intelligent switch may be configured to notify providers of acceptance of their bids (362), and in response thereto the provider may be expected to provide the service (e.g., to ship the item or to insure the item during shipping) (364). The intelligent switch may also be configured to notify carriers of the closing of a bidding period for a request for quote (366). Similarly, in some embodiments the switch may be configured to notify providers that their quote has been outbid, thereby giving the outbid provider an opportunity to increase their bid.

Figure 2F:
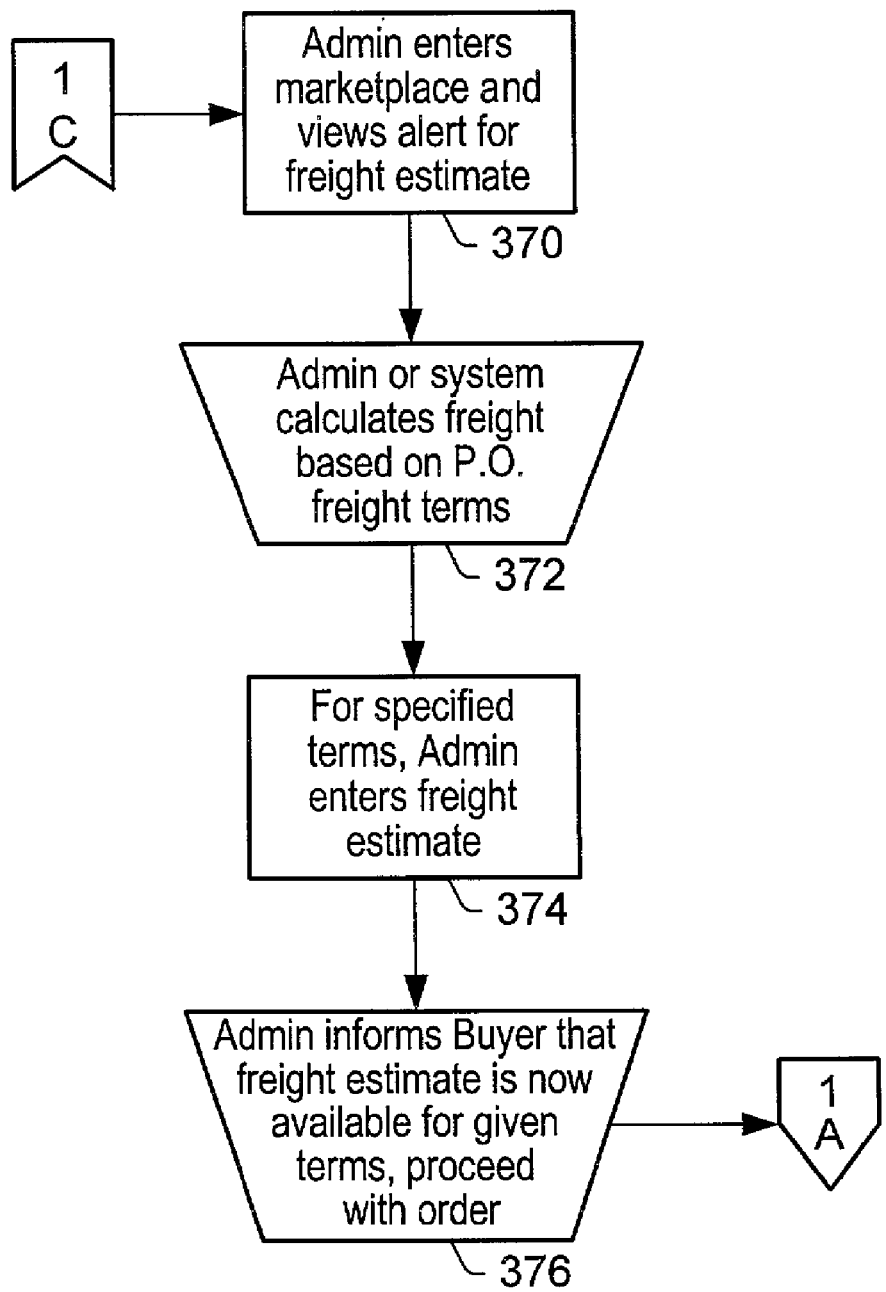

Turning now to FIG. 2F, additional details of one embodiment of the system 100 are shown. As FIG. 2F illustrates, the administrator may be permitted to interface with the e-marketplace and/or intelligent switch to view alerts for rate estimates (370). In some embodiments, either the administrator or the system may be configured to calculate rate pricing based on the purchase order terms (372). This calculation may be based on the data in database 128 or additional tables or formulas provided by logistics and/or insurance providers 112-118. Once the particular freight estimate or quote amount for the services selected by the user are determined by the system or administrator, these estimate amounts may be associated with the quote (374), and the system may be configured to inform the buyer that an estimate is now available (376). Similarly, in some embodiments the system may be configured to allow the administrator manual control over these operations.

Turning now to FIG. 3, one embodiment of a user interface (398) for one embodiment of pop-up menu module 104 is shown. Note, in some embodiments user interface 398 may also be used as part of e-marketplaces 106 and 108 and/or intelligent switch 102. In this embodiment, user interface 398 may include a prompt asking the user whether the user desires a shipping quote (404) and/or an insurance quote (402). If the user desires a quote, the user may be prompted for a delivery date (404). Similarly, the user may be prompted for information about the item to be shipped including its weight (406), its dimensions (408), whether or not the item is hazardous or fragile (410) and the item's insurance amount (418). Similarly, the user may be prompted for a pick-up address (412), a delivery address (414), and a date by which the item will be available for pick-up (416). In some embodiments, the user interface may also include prompts to query the user for payment information (420). For example, payment information may include a bank account number or a credit card number. Note, FIG. 3 merely illustrates one embodiment of a user interface. Other user interfaces are also possible and contemplated. For example, in some embodiments information requested by user interface 398 may be obtained from previous interactions with the user (e.g., through the purchasing processing at e-marketplaces 106 through 108). In one embodiment, user interface 398 may be implemented using HTML (Hyper Text Mark-up Language).

Turning now to FIG. 4, one embodiment of database 128 and table 130 are shown. As shown in FIG. 4, in this embodiment Table 130 includes product information 450, source information 452, Internet address information 454, account number information 456, price information 458, quantity information 460, shipping location information 462, lead time information 464, contact information 466, mailing address information 468, service information 470, insurance amount information 472, deductible information 474, exclusion information 476, weight information 480, maximum size information 482, shipping restriction information 484, source and destination information 486 through 488, pick-up date information 490, and delivery date information 492. As shown in the Figure, production information 450 may include a description of the item to be shipped. Source information 452 may include the name of the company or party shipping the item. Internet address 454 may include e-mail and/or web address information for the source of the item being shipped. Account number information 456 may include billing account information for the source of the goods.

Price information 458 may include information on the price paid for the item. Quantity 460 may include information regarding the number of items to be shipped. Shipping location information 462 may include information at the pick-up location of the goods being shipped, and lead time information 464 may include information about how long from the date of order until the item will be ready to be shipped. Contact information 466 may include information such as a sales representative's name, and mailing address information 468 may include the mailing address and/or billing address of the source of the item being shipped.

As shown in FIG. 4, service information 470 may also be stored. For example, this may include an identifier as to the type of service associated with the entry in the table. For example, freight or shipping services and insurance services may have entries in the table. Service entries for insurance may include fields such as the amount of insurance desired 472, any deductible amounts 474, and any exclusions to the insurance coverage 476. For example, codes may be used to identify different exclusions for the different insurance price quotes entered in Table 130. For example, entry 498 corresponds to an insurance price quote for shipping insurance from PDQ Insurance Company. Similarly, entry 499 in Table 130 corresponds to a quote for shipping from Airco Freight Company.

Entry 496 may correspond to price quotes for products being sold as opposed to services. Alternatively, product entries 496 may be entries corresponding to a particular accepted quote that has been accepted by a user. As part of shipping quote 499, maximum weight 480, size 482, and other restrictions 484 may be included with the quote. Similarly, source and destination information 486 through 488 may be included, as well as any potential limitations as to pick-up date 490 and/or the date 492. For example, in one embodiment a quote from a shipping company may exclude certain pickup and delivery dates around popular holidays (e.g., Christmas). Note, the example shown in FIG. 4 is merely one embodiment of a table that may be included in database 128. Other configurations and types of information may be stored in database 128. In one embodiment, database 128 may be stored in XML native format, in an SQL database format, or in a simple tab delineated table format.

Turning now to FIG. 5, one embodiment of historical database 146 is shown. As previously noted, historical database 146 may be configured to store information relating to completed transactions. In this example, one completed transaction may include the following information: a transaction tracking number 500, a consumer name or customer name 502, a consumer mailing address or customer mailing address 504, a consumer or customer billing address 506, a consumer or customer Internet address 508, a price paid for the item being shipped 510, a quantity for the number of items being shipped 512, a product source name for the source of the item being shipped 514, a product source address 516, a product source billing address 518, a product source Internet address 520. Furthermore, in some embodiments, additional information related to the transaction may be stored such as logistics price information for the shipping and/or freight services 522, the name of the logistics provider 524, and the logistics provider's address, billing address, and Internet address (526 through 530). Similar information for the insurance provider, if any, may be included. For example, the price paid for the insurance 532, the name of the insurer 534, and the insurer's address, billing address, and Internet address (536 through 540) may be included. Payment information for the product itself, the insurance, and logistics services, may also be included 542.

In some embodiments, a description of the product 544, serial number 546, order date 548, and scheduled shipping date 550 may also be included. As previously noted, tax information 552, shipping source and destination 554 through 556, product weight 558, and actual shipping date 560 and actual arrival date 570 may also be stored. Information regarding insurance terms 556 and any insurance claims 572 may also be stored, along with any arbitration information 562 (e.g., resolutions or arbiter decisions). Any adjustments to the prices paid as the result of arbitration 564 may also be included. Information about the condition of the item before and/or after shipping may also be stored in historical database 146 (e.g., see block 574). Other information that may be stored includes digital signature information indicative of the buyer's acceptance 578 and additional transaction-related data 580. Note, the entry in historical database 146 shown in FIG. 5 is merely one example of some types of information that may be stored therein. Other embodiments are possible and contemplated.

Figure 6:
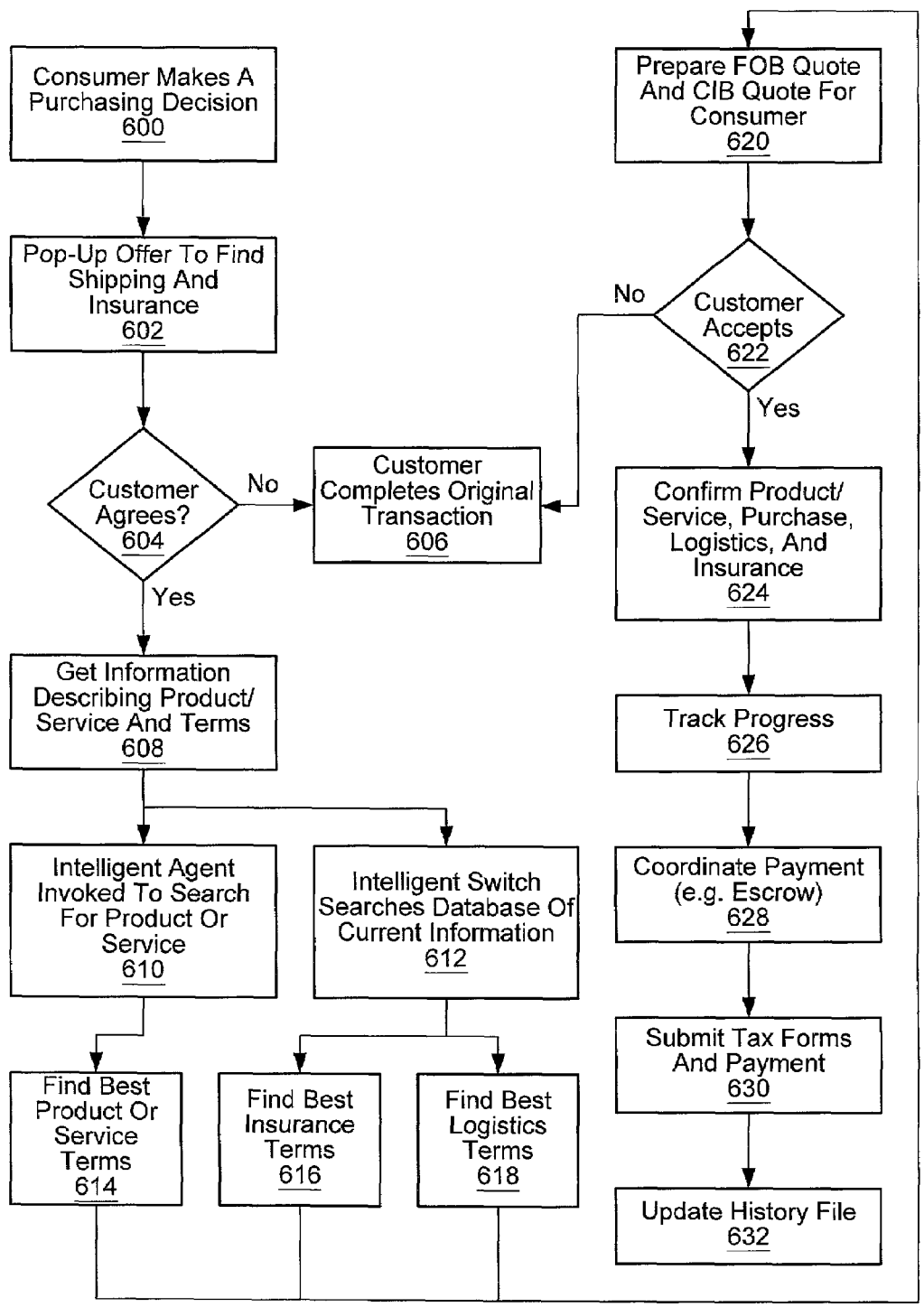
FIG. 6 is a flowchart diagram depicting one embodiment of a method for negotiating and providing quotes for freight and insurance.

Turning now to FIG. 6, one embodiment of a method for negotiating and providing quotes for freight and insurance in real time is shown. As illustrated in FIG. 6, a consumer may make a purchasing decision (600). In response thereto, a pop-up menu offering to find shipping and insurance for the purchased item may be displayed (602). As previously noted, in one embodiment this function may be implemented using a downloadable plug-in for a web browser. If the customer does not agree (604), then the customer may complete the original transaction without further involvement from the intelligent switch (606). If, however, the customer agrees to allow the system to find shipping and insurance pricing information, the system may configured to query the customer to determine information describing the product and any terms desirable to the customer (608). For example, the system may display a user interface such as that described in FIG. 3. The system may then be configured to use the information to invoke a search for the services (610).

In one embodiment, the intelligent switch may be configured to dispatch an "intelligent agent" to perform the search and find the best service terms (614). An intelligent agent is a software program configured to autonomously search a network such as the Internet for price quotes. In parallel, or as an alternative to searching, the intelligent switch may be configured to query or search the database of current information (612) in order to find the best insurance terms (616) and search for best logistics terms (618). The system may be configured to select from the best terms found in order to prepare a quote for the consumer (620). In some embodiments, both FOB (free on board) quotes and CIF (including cost of goods, insurance, and freight) quotes may be provided to the consumer.

Once the customer has reviewed the quote, the customer may be given an opportunity to accept the quoted services (622). If the customer accepts the services, a confirmation may be sent to the service providers (624). In some embodiments, the intelligent switch may be configured to track the progress of the shipping transaction (626). Furthermore, the system may also be configured to coordinate payment (628). For example, upon the customer's acceptance of the shipping terms, the system may be configured to charge the customer's account or credit card or bank account. In some embodiments these funds may be automatically transferred to an escrow account pending successful completion of the shipping transaction. Similarly, in some embodiments the system may also be configured to calculate any applicable taxes, file the applicable tax forms, and submit the applicable tax payments to appropriate government authorities (630). Finally, once the transaction has been completed and the customer has accepted delivery of the shipment, the system may be configured to update the historical database 146 to reflect the completed transaction (632).

Figure 7:
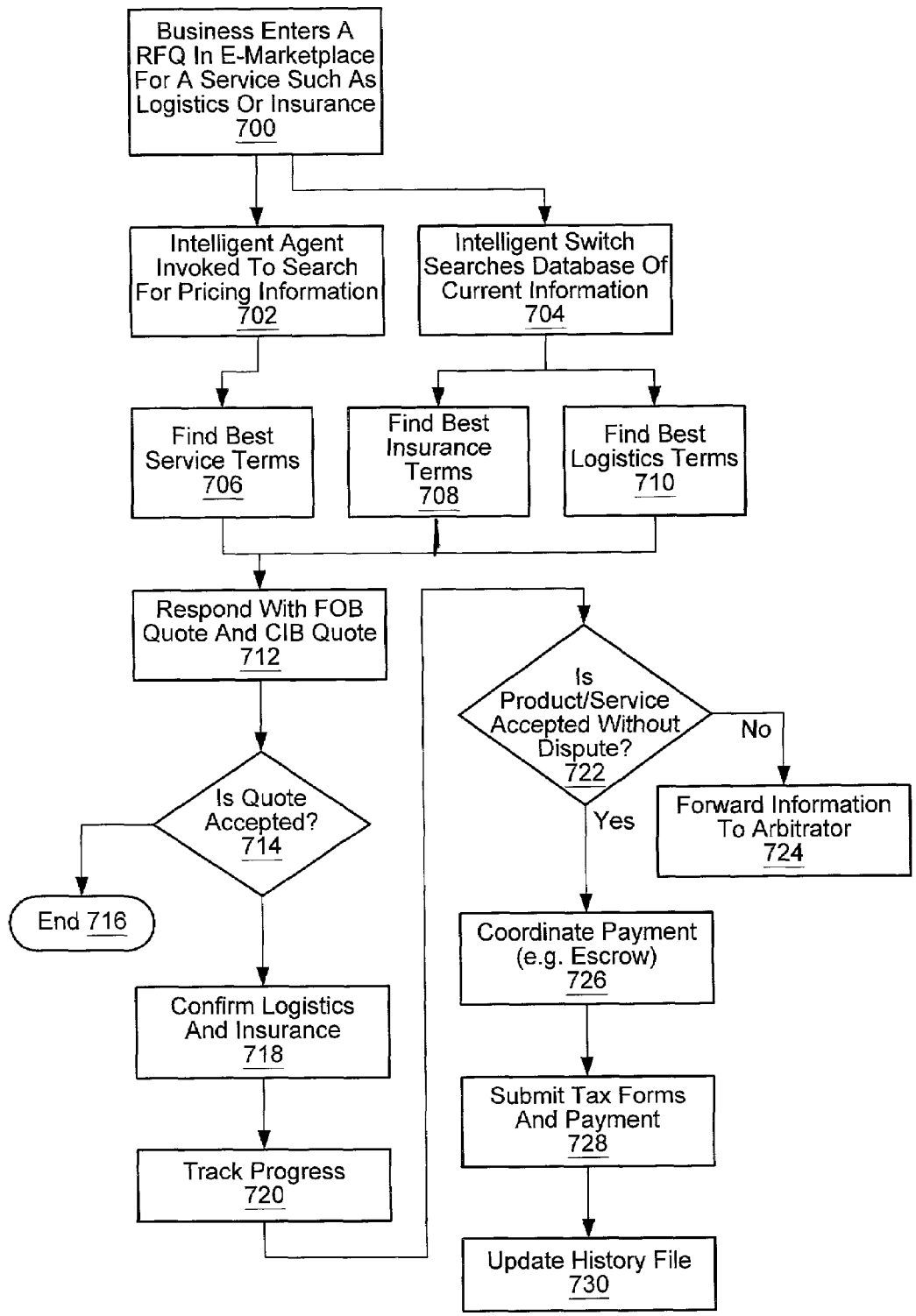
FIG. 7 is a flowchart diagram depicting another embodiment of a method for negotiating and providing quotes for freight and insurance.

Turning now to FIG. 7, a flowchart depicting another embodiment of a method for negotiating and confirming quotes for freight and insurance services is shown. Note, the methods illustrated herein may be implemented using a variety of different techniques. For example, in one embodiment the methods may be implemented using software configured to execute in a "real time" manner. As used herein, real time means execution such that there is no significantly noticeable delay or inconvenient delay experienced by the end user. In other embodiments, however, the methods may be executed in an offline or non-real time manner. As illustrated in FIG. 7, a business may be configured to enter a request for quote in an e-marketplace connected to the intelligent switch for a product or service such as logistics or insurance (700). While this example relates to a business-to-business transaction, the intelligent switch may be configured to once again dispatch an intelligent agent to search for the desired services and to search the current database (702 and 704). As previously described, the results of these searches may yield insurance and logistics pricing information (706, 708, and 710). Note, while the examples herein illustrate searches that focus on pricing, additional terms such as delivery dates and insurance values may be used as search criteria depending upon the customer's indicated preference.

Once the pricing information has been accumulated, the intelligent switch may be configured to respond with quotes to the customer (e.g., an FOB quote and a CIF quote for shipping) (712). The customer may be provided with an opportunity to accept the quote (714). If the customer accepts the quote, the confirmation message may be sent to the service providers and the customer (718). As previously noted, the system may be configured to track the progress of the shipping transaction (720). In some embodiments, the system may also be configured to track any disputes associated with the delivered product or service (722). If the shipment is accepted without dispute, the system may be configured to coordinate payment (726), submit tax forms and payment (728), and update the historical database (730) accordingly. If, however, a dispute does arise, the system may be configured to forward all accumulated information to an arbiter (724). As part of the service, the system may be configured to await a finding or ruling from the arbiter before issuing any payments or refunds from any escrows that have been collected.

Figure 8:
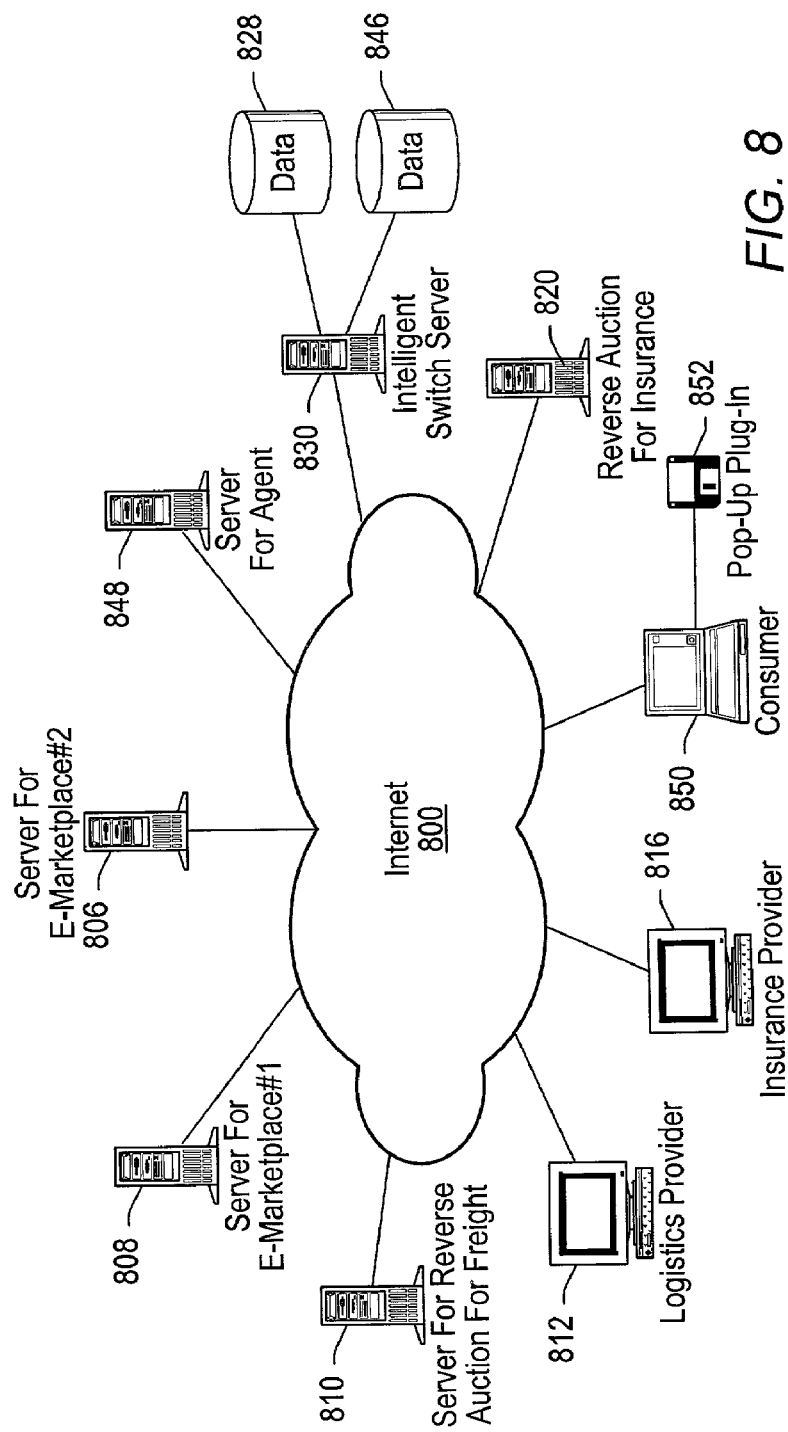
FIG. 8 is a diagram depicting one embodiment of a system for negotiating and providing quotes for freight and insurance.

Turning now to FIG. 8, one embodiment of a computer network useable to implement the system and the methods described herein is disclosed. In this embodiment, the network 800 includes a number of servers and client computers connected to a network 800 (e.g., the Internet). As shown in the figure, a server 820 may be used to implement the reverse auction for insurance and a separate server 810 may be used to implement the reverse auction for freight services 810. Similarly, separate servers 806 and 808 may be implemented for each e-marketplace, and separate servers for the data program 828 may also be used.

As described in the figure, a server 830 may be used to execute the intelligent switch and manage multiple databases 828 and 846 that may correspond to database 128 and historical database 146 from FIG. 1. As also illustrated in FIG. 8, the logistics providers and insurance providers may use client computers (e.g., personal computers or laptop computers or workstations or Internet appliances) to access the intelligent switch through the network. Similarly, consumers may use computers such as laptop 850 in order to access either the e-marketplaces or the reverse auctions or the intelligent switch services (e.g., using plug-in 852). As shown in the figure, the program may be distributed as software via the network or on a computer storage medium (e.g., a computer diskette, CD-ROM, or DVD-ROM). Note, the embodiment illustrated in the figure may be modified based on the particular implement selected. For example, in different embodiments, wireless links may be used to connect one or more of the different components of the system.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A system for negotiating freight and insurance transactions, the system comprising a server comprising a computer readable medium comprising program instructions executable by the server to:

provide a first set of interfaces configured to connect two or more freight carriers to the server;

provide a second set of interfaces configured to connect two or more insurance providers to the server;

search a network for pricing information, wherein to search the network the program instructions are executable by the server to access said pricing information and corresponding terms through at least said first and second sets of interfaces; and maintain a current database comprising said pricing information and said corresponding terms;

provide one or more interfaces configured to connect one or more emarketplaces to the server, wherein the one or more emarketplaces are separate from said server and are configured to allow purchasers to enter descriptions of items the purchasers wish to ship and insure;

receive from one of the one or more emarketplaces, an indication of a request for a quote for pricing information for freight services for one or more items and pricing information for insurance services for said one or more items;

in response to receiving the indication, generate the quote, wherein to generate the quote the program instructions are further executable to search the current database for pricing information for freight services and insurance services relevant to said one or more items, wherein the pricing information searched in the current database is stored in the current database prior to the server receiving said indication; and provide said quote, wherein said quote indicates pricing information for freight services for said one or more items and insurance services for said one or more items.

2. The system of claim 1, wherein the program instructions are further executable by the server to conduct a reverse auction for insurance coverage.

3. The system of claim 2, wherein the reverse auction for insurance coverage is for prospective items for which there are no pending indications of requests for quotes, wherein one or more computer systems are configured to use the results of the reverse auction for insurance coverage to update the current database with pricing information.

4. The system of claim 1, wherein the program instructions are further executable by the server to conduct a reverse auction for freight services.

5. The system of claim 4, wherein the reverse auction for freight services is for prospective items for which there are no pending indications of requests for quotes, wherein one or more computer systems are configured to use the results of the reverse auction for freight services to update the current database with pricing information.

6. The system of claim 1, wherein the program instructions are further executable by the server to:

provide a client software module configured to display a pop-up menu on a user's computer in response to detecting that the user has made a purchasing decision associated with said one or more items, wherein the pop-up menu is configured to allow the user to request said quote for pricing information for freight services and insurance services for said one or more items.

7. The system of claim 1, further comprising a historical database configured to receive information from the current database, wherein the historical database comprises information pertaining to completed freight and insurance transactions.

8. The system of claim 1, wherein the first set of interfaces, the second set of interfaces, and the interfaces configured to connect to one or more emarketplaces comprise software modules configured to communicate via the Internet.

9. The system of claim 1, wherein the current database includes current pricing information for products and services, wherein the program instructions are executable by the server to update the pricing information and the corresponding terms of the current database by searching the Internet for updated pricing information.

10. The system of claim 1, wherein to generate the quote the program instructions are further executable to search, subsequent to receiving said indication, for pricing information for freight services and insurance services relevant to said one or more items through said first set of interfaces and said second set of interfaces.

11. The system of claim 1, wherein program instructions are further executable by the server to:
receive from a user's computer another request for another quote for pricing information for freight services for the one or more items and pricing information for insurance services for said one or more items; and
generate the other quote and provide the other quote to said user's computer.

12. A computer-implemented method, comprising:
accessing one or more insurance provider's computer systems to obtain insurance pricing information for one or more representative shipping transactions;
storing the insurance pricing information into a current database;
accessing one or more freight carrier's computer systems to obtain freight pricing information for the representative shipping transactions;
storing the freight pricing information into the current database;
receiving a purchase order from a customer, wherein the purchase order includes information about an item that is to be shipped and insured from a first location to a second location;
searching the current database to find corresponding insurance pricing information and corresponding freight pricing information for the item; and
providing a quote to the customer based on the corresponding insurance pricing information and the corresponding freight pricing information.

13. The method of claim 12, further comprising:
in response to detecting that the current database does not include the corresponding freight pricing information, accessing the one or more freight carrier's computer systems to obtain the corresponding freight pricing information.

14. The method of claim 13, further comprising:
updating the current database with the corresponding freight pricing information from the one or more freight carrier's computer systems.

15. The method of claim 12, further comprising:
in response to detecting that the current database does not include the corresponding insurance pricing information, accessing the one or more insurance provider's computer systems to obtain the corresponding insurance pricing information.

16. The method of claim 15, further comprising:
updating the current database with the corresponding insurance pricing information from the one or more insurance provider's computer systems.

17. The method of claim 12, further comprising:
storing the quote in a historical database comprising information regarding completed shipping and insurance transactions.

18. The method of claim 12, further comprising:
receiving a confirmation from the customer, wherein the confirmation indicates the customer's acceptance to the terms of the quote.

19. The method of claim 18, further comprising:
dispatching electronic messages to the freight carrier and the insurance provider corresponding to the accepted quote.

20. The method of claim 18, further comprising:
conducting one or more reverse auctions to obtain freight pricing information for the representative shipping transactions.

21. The method of claim 12, further comprising:
receiving an indication of an other purchase order from an emarketplace separate from said database and said customer, wherein the emarketplace is configured to allow customers to enter purchase orders for one or more representative shipping transactions, wherein the other purchase order includes information about an item that is to be shipped and insured from a first location to a second location.

22. A computer-readable storage medium, storing program instructions that when executed by a computer implement:
generating a database of current freight and insurance pricing information;
detecting a user's purchasing decision;
searching the database for specific freight and insurance pricing information corresponding to the user's purchasing decision;
generating a quote for the user based on the specific freight and insurance pricing information, wherein the specific freight and insurance pricing information is stored within said database prior to said detecting the user's purchasing decision;
detecting the user's acceptance of the quote's terms; and
confirming the user's acceptance of the quote, wherein said confirming comprises providing an indication of the user's acceptance of the quote to one or more freight carriers and insurance providers that correspond to the specific freight and insurance pricing information included in the quote.

23. The medium of claim 22, wherein said indication of the user's acceptance of the quote is an automatically-generated email message that is transmitted over the Internet.

24. The medium of claim 22, wherein the quote includes a first amount for freight pricing and a second amount for insurance coverage.

25. The medium of claim 22, wherein the program instructions are further computer-executable to implement maintaining a historical database of information relating to accepted quotes.

26. The medium of claim 22, wherein the program instructions are further computer-executable to implement billing the user an amount equal to the freight price and insurance price on the accepted quote.

27. The medium of claim 22, wherein the program instructions are further computer-executable to implement performing one or more queries for freight pricing information in response to determining that the database does not include freight pricing information applicable to the user's purchase, wherein the queries are communicated to one or more remote computer systems via a computer network.

28. The medium of claim 27, wherein the computer network is the Internet.

29. The medium of claim 22, wherein the program instructions are further computer-executable to implement performing one or more queries for insurance pricing information in response to determining that the database does not include insurance pricing information applicable to the user's purchase.

30. The medium of claim 22, wherein the program instructions are further computer-executable to provide a world wide web interface.

31. The medium of claim 27, wherein the program instructions are farther computer-executable to implement searching the database for both direct freight routes and indirect freight routes that include one or more intermediate destinations.

32. The medium of claim 27, wherein the freight pricing information includes information from two or more different freight carriers, and wherein the insurance pricing information includes information from two or more different insurance providers.

33. The medium of claim 22, wherein the program instructions are farther computer-executable to implement searching the database for both single freight carrier solutions and multiple freight carrier solutions.

34. The medium of claim 27, wherein the quote includes a CIF (Cost, Insurance, and Freight) quote and an FOB (Free On Board) quote.

* * * * *